P. M. FREER.
FRICTION DEVICE.
APPLICATION FILED JUNE 24, 1910.
1,008,595.  Patented Nov. 14, 1911.
2 SHEETS—SHEET 1.
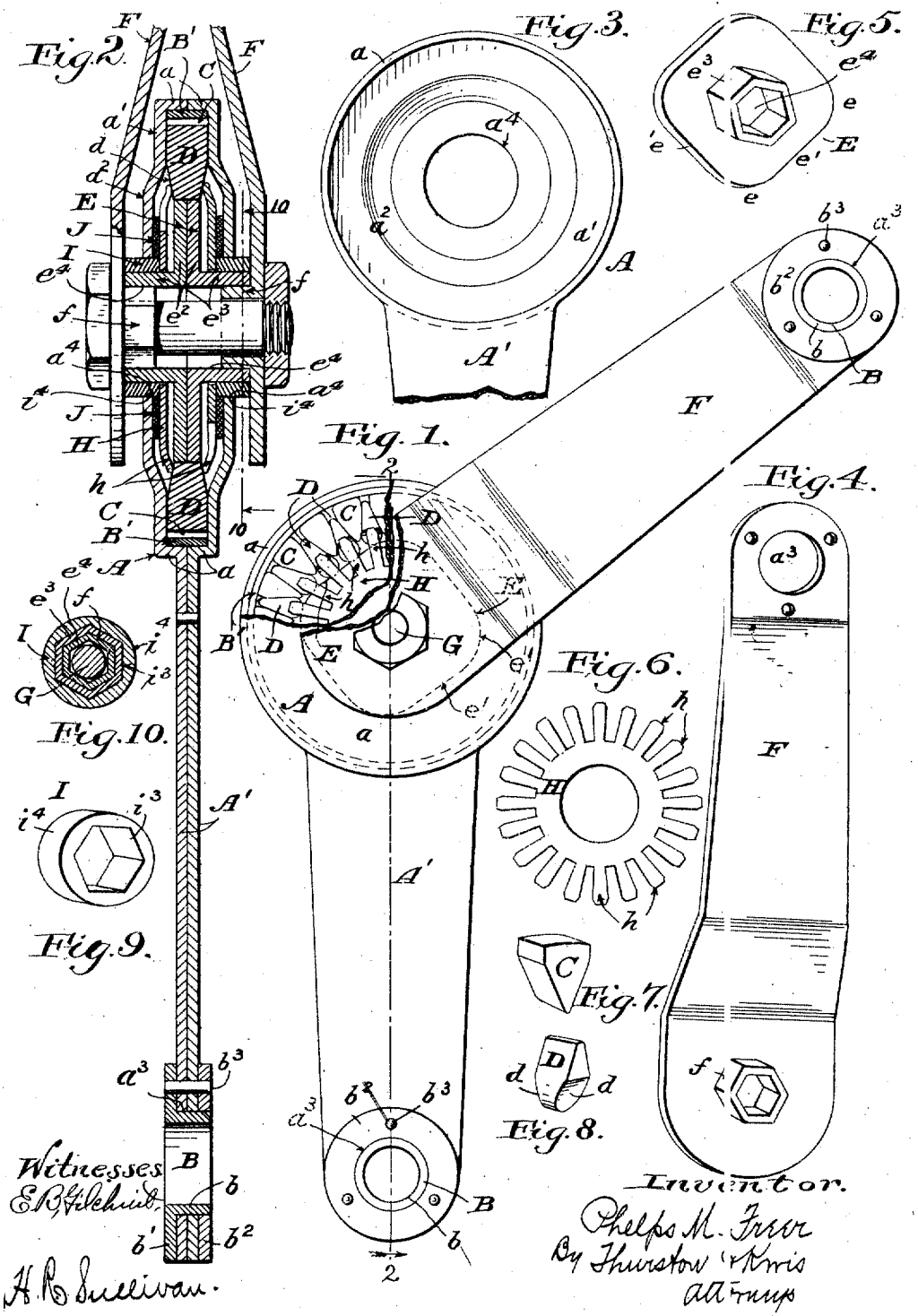

P. M. FREER.
FRICTION DEVICE.
APPLICATION FILED JUNE 24, 1910.
1,008,595.
Patented Nov. 14, 1911.
2 SHEETS—SHEET 2.
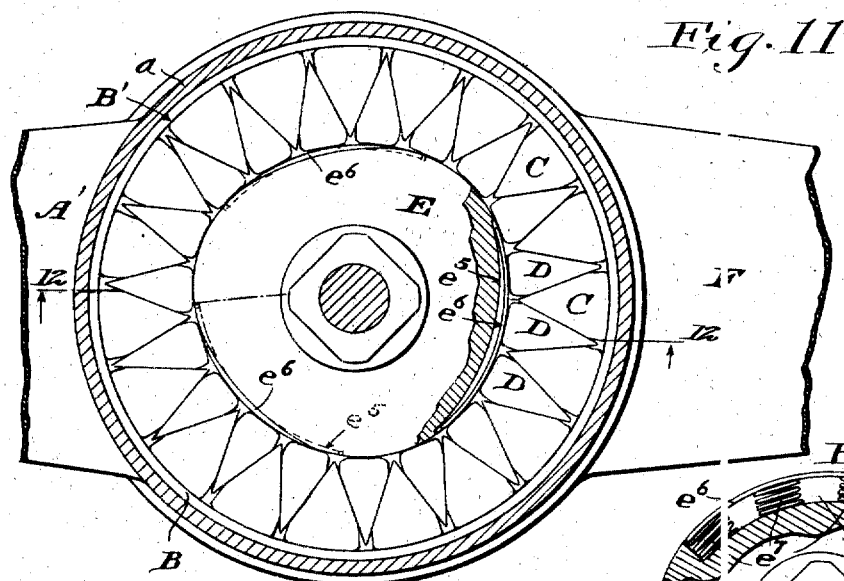
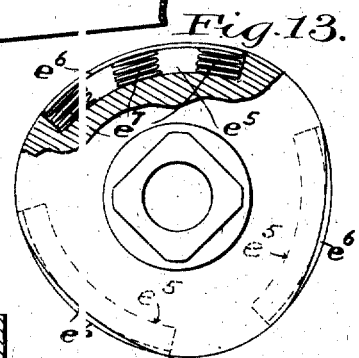
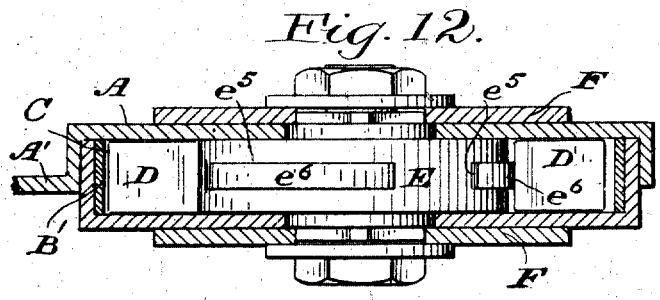
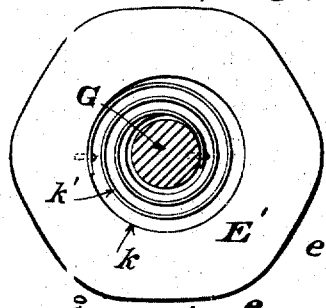
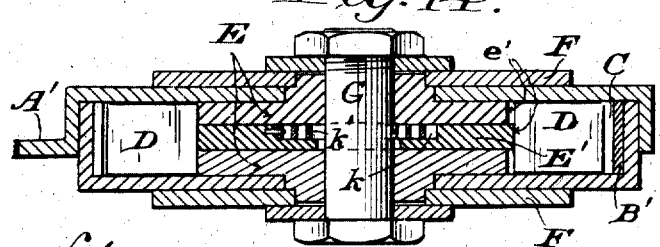
Witnesses
E. B. Gilchrist
H. E. Sullivan
Inventor
Phelps M. Freer
By Thurston & Kwis
Attorneys

UNITED STATES PATENT OFFICE.

PHELPS M. FREER, OF BARBERTON, OHIO.

FRICTION DEVICE.

1,008,595.  Specification of Letters Patent.  Patented Nov. 14, 1911.

Application filed June 24, 1910. Serial No. 568,632.

*To all whom it may concern:*

Be it known that I, PHELPS M. FREER, a citizen of the United States, residing at Barberton, in the county of Summit and State of Ohio, have invented a certain new and useful Improvement in Friction Devices, of which the following is a full, clear, and exact description.

This invention relates to a friction device designed to retard or prevent the too rapid relative movements of two parts or bodies to which it may be applied without, however, limiting the natural range of such movements; it being in effect somewhat on the order of the well known dash pots, but movable metallic parts substituted for the usual fluid element and delicate means for controlling it common in that class of devices. Being composed entirely of metal or the like, and all of the parts under perfect mechanical control, this invention may be used in any desired position. It is well adapted for use as a shock absorber for automobiles or like vehicles, and the drawing illustrates the invention in a form suitable for this purpose.

In its principal features, this invention is like that embraced by my pending application for friction devices, filed February 5th, 1910, Serial No. 542,219, on which this present invention is an improvement.

In the drawings which show the embodiment of this invention in forms now deemed most desirable, Figure 1 is a side elevation, with some of the casing parts partially broken away for the purpose of more clearly illustrating those lying beneath them. Fig. 2 is a longitudinal section on a slightly enlarged scale and mainly through one of the lever-and-casing members and taken on the line 2—2 of Fig. 1. Fig. 3 is a detached detail of a portion of one of the principal lever arms, and the half-cup casing integrally formed thereon. Fig. 4 is a perspective view of one member or half of the other lever arm. Fig. 5 is a perspective view of one portion or half of the cam member, two of such members being placed together back to back to form a complete cam. Fig. 6 is a side elevation of one of the spider springs employed in connection with the inner series of radially movable wedge members. Fig. 7 is a perspective view of one of the wedge members of the outer series. Fig. 8 is a similar view of one of the wedge members of the inner series, which, in working position, alternate with those of the outer series. Fig. 9 is a perspective view of one of the bushings or spacing thimbles employed in the device. Fig. 10 is a sectional view across the hub portions, etc., of the several members, the section being taken on the line 10—10 of Fig. 2. Fig. 11 is a side elevation or open face view of the casing and the wedges inclosed thereby with a modification of the wedge actuating cam and springs to retard the inward movements of the inner series of wedges. Fig. 12 is a section through the same on the line 12—12 of Fig. 11. Fig. 13 is a detached view of a cam with modification of the retarding springs. Fig. 14 is a vertical transverse section of a construction embodying still another modification of the cam. Fig. 15 is a face view of the cam with its retractile spring and clamping bolt and is formed with six sides or crests and valleys.

In this invention, as in that of my before mentioned prior application, the principal features consist of two opposed series of intermeshing wedges or blocks having inclined contact surfaces and set within a given space, the bases of one series abutting against a wall, and those of the other inverse series disposed away from the wall with their protruding bases acted upon by a cam member. This cam is movable in a path parallel to said wall and has a curved or waved cam surface, the crests and valleys of which are about equally disposed along a medium line so that the displacement of some of the wedges of one series and their being driven into deeper enmeshment with those of the other series caused by the crests or high points of the cam, may be compensated for by the valleys or low points of the cam which afford spaces for the retraction, or movement out of mesh, of other wedges of the first mentioned series. In this embodiment of the invention the two series of wedges are inclosed, as before, by a cylindrical casing against the annular wall of which the bases of the outer series of wedges bear, and it is also provided with a rotatable or oscillating cam mounted in the casing and acting upon the bases of the inner series of wedges. The casing is suitably connected to one lever and the cam to another, the two levers being connected respectively to two bodies whose relative movement it is desired to control. Recent experimenting and thought have led to certain developments which improve the action of the device and also its construction, simplifying the parts and greatly cheapening the cost of their production, as hereinafter set forth.

In the preferred form shown in Figs. 1 to 10, inclusive, the casing is made in two duplicate parts A, of stamped sheet metal, each having an annular wall $a$ and a side wall $a'$ dished out as at $a^2$ to provide greater lateral space at the center than is required at the periphery. Each section of the casing has an integral lever arm A' formed on its open side, the two arms, when assembled, lying together and riveted or otherwise secured to form a single member. At the free end of this lever is an aperture $a^3$ extending through both parts and forming a seat for a bearing bushing B, the apertured body $b$ of which projects through and beyond the two thicknesses of the arm. A flange $b'$ at one end of the bushing and a washer $b^2$ at the other end are connected by any suitable means, such as the rivets $b^3$, which extend through both and also through the intermediate thickness of the lever arm.

The narrower peripheral portion of the casing is lined with a steel band or collar B' which forms a bearing surface for the bases of the wedges C of the outer series. The apices or small ends of these wedges point toward the axial center of the casing, while the apices of the other series of wedges D point away from said center and have their base ends bearing upon a cam disk E, as shown. The cam in this instance is shown as having a waved surface that provides four high points $e$ and four low points or valleys $e'$ about equally disposed within and without a medium line. While this cam is shown as having four sides or crests and valleys, a greater or less number may be used as found desirable, as, for instance, the six-sided or hexagonal cam of Figs. 14 and 15.

The cam is preferably composed of two duplicate parts made of stamped sheet metal, each having a disk portion $e^2$ and a hub or side boss $e^3$ having an aperture $e^4$ extending therethrough. The hub and aperture are preferably formed hexagonal, as shown in Fig. 5, to fit upon and within other members with which they coöperate. The disk portions of the cam are assembled back to back and their hubs projecting laterally at each side fit snugly upon hexagonal bosses $f$ of lever arms F, thus rigidly connected to the cams. These lever arms with their bosses are preferably formed of stamped metal; the arms converge beyond the periphery of the casing A and meeting are united to form a single member having an aperture at its end similar to that of the arm A' and similarly provided with a suitable bushing, etc. A bolt G passes through the hubs of the arms and clamps them and the cam hubs rigidly together.

It has been found desirable to retard the retraction of the inner wedges toward the valleys of the cam and to effect this several devices have been tried, that shown in Figs. 1 to 10 being the most desirable for many purposes. In this construction both sides of the inner ends of the D series of wedges are inclined as shown at $d$, Figs. 2 and 8, and two disks H having peripheral spring fingers $h$ slightly dished at their ends, bear upon the inclined surfaces of these wedges to yieldingly resist their inward retractile movements. These disks H lie at each side of the cam disk and are pressed toward it by spacing thimbles or bushings I lying between the disks H and the inner faces of the arms F, the bushings having hexagonal apertures $i^3$ to fit upon the bosses $e^3$ and cylindrical exteriors $i^4$ to turn in the round apertures $a^4$ in the side walls of the casing.

The spring disks H have round axial apertures adapted to turn upon the exteriors of the hexagon hubs $e^3$ of the cams so as to leave them free from rotating with the cams, and the ends of the spring fingers $h$ bear upon the inclined surfaces of the D wedges at points on said surfaces that are below the plane of the surfaces of the C wedges. This arrangement provides for holding the spring disks in fixed relation to the wedges following their rotary movements so that each finger is held in constant contact with its particular wedge.

To vary the pressure of the spring fingers $h$ on the inclined sides of the D wedges longer or shorter bushings I may be employed, the longer bushings crowding the spider-springs into firmer contact with the wedges. For dust protection washers J of felt or other suitable material may be employed. The abutting edges of the casing walls are also finely fitted together to keep out dust and prevent leakage of lubricating oil which should be freely supplied to the inner working parts of the device.

In Figs. 11 to 15 are shown several modifications of the means for yieldingly resisting the retraction of the D wedges into the valleys of the cam when they are displaced by the outward advance of other D wedges by the crests of the cam and the consequent transverse or side movement of all the adjacent wedges. Instead of the spring disks H just described the valleys of the cams, shown in Figs. 11, 12 and 13, have grooves or recesses $e^5$ formed in their surfaces of less width than the full cam face, and in these recesses are fitted flat springs $e^6$ of slightly less length than the recesses, bearing at their ends on the bottoms of the recesses and so shaped that between their ends they project slightly beyond the valley faces of the cams. As the D wedges are forced toward the cam they encounter these springs before reaching the solid faces of the cam valleys and the resistance of the springs to their further inward movement greatly increases the frictional resistance to both the lateral and radial movements of all the wedges in both series. In Fig. 13 the recesses $e^5$ are shown as having greater depth through their entire length, and the flat springs $e^6$ do not rest upon the bottoms thereof but are supported by a series of small spiral springs $e^7$ at as frequent intervals as may be found necessary. In these just described modifications the cams are shown as composed of a single solid piece with the grooves $e^5$ cut in its face, but it might be made in two parts, as previously described, and the springs $e^6$ properly supported between them. In Figs. 14 and 15 is shown still another means to the same end. The cam disk E is preferably made in two parts, as before described, and between them is located an independently rotatable cam disk E', whose valley edges project slightly beyond the valley edges of the main cam disks E. This disk E' has a central aperture $k$ enough larger than the clamping bolt to permit the disk to float at will and it is yieldingly restrained against rotation by a coil spring $k'$ one end of which is secured to the rigid axial bolt and the other to the cam disk E'. In this structure the retracting wedges will first encounter this floating disk and in their transverse or rotary movement have a tendency to drag it with them until they again ride upon the higher faces of the cam disks E. The floating cam will yield to this tendency and follow the wedges as far as the spring $k'$ will permit; then the retractile pull of this spring will be operating the floating cam in a manner to yieldingly resist the inward movement of the D wedges.

Having described my invention, I claim:

1. In a friction device, the combination of a wall, a series of wedge members having their bases resting against said wall and movable laterally thereon, a series of inverse wedge members movable endwise and partially intermeshed with said first mentioned series, their base ends projecting beyond the apices of the first mentioned series, all of said wedges being arranged within a given length of space, a cam having a waved face adapted to operate on said projecting base ends of the second mentioned series to drive some of them into deeper engagement with the other series while permitting the retraction of others therefrom with means to yieldingly resist such retracting movements of said wedges.

2. In a friction device, the combination of a wall, a series of wedge members having their bases resting against said wall and movable laterally thereon, a series of inverse wedge members movable endwise and partially intermeshed with said first mentioned series, their base ends projecting beyond the apices of the first mentioned series, and having inclined sides contracting toward their inner base ends, all of said wedges being arranged within a given length of space, a cam having a waved face adapted to operate on said projecting base ends of the second mentioned series to drive some of them into deeper engagement with the other series while permitting the retraction of others therefrom with means for applying lateral pressure on said inclined sides of the second series of wedges to yieldingly resist such retracting movements of said wedges.

3. In a friction device, the combination of a wall, a series of wedge members having their bases resting against said wall and movable laterally thereof, a series of inverse wedge members movable endwise and partially intermeshed with said first mentioned series, their base ends projecting beyond the apices of the first mentioned series, and having inclined sides contracting toward their inner base ends, all of said wedges being arranged within a given length of space, a cam having a waved face adapted to operate on said projecting base ends of the second mentioned series to drive some of them into deeper engagement with the other series while permitting the retraction of others therefrom with spring fingers pressing laterally upon said inclined sides of the second series of wedges to yieldingly resist such retracting movements of said wedges.

4. In a friction device, the combination of a casing having an annular wall, an annular series of wedges having their bases resting on said wall and movable circumferentially therealong, a series of inverse wedges partially intermeshed with said first mentioned series, the two series of wedges when in mean engagement just fairly filling the annular space provided for them inside the annular wall, the wedges of the inner series being movable endwise radially and having inclined sides contracting toward their inner base ends, a rotatable cam having a waved face adapted to engage and move said inverse wedges serially into deeper mesh and to provide space for the serial retreat of certain other wedges of the same series, with disks having radial spring fingers on their peripheries adapted to bear upon the opposite inclined sides of the individual wedges and yieldingly resist their retreat out of mesh engagement.

5. In a friction device, the combination of a casing with an annular wall and a disk having a waved cam peripheral surface rotatably mounted in the casing, a series of wedge members having their bases bearing against the annular wall, an inverted set of wedge members enmeshed with the first and having their bases inclined at each side and acted upon by the cam disk with spring disks mounted at each side of the cam upon its hubs and having radial spring fingers which bear upon the inclined inner ends of the inner series of wedge members with a clamping bolt acting to press the springs upon the wedge members.

6. In a friction device, the combination of a casing composed of duplicate parts each having an annular wall, an integral lever arm and a side wall with round central perforation, the edges of the annular wall and the faces of the lever arms being brought together in assembling, two series of intermeshing wedge members substantially as described, a cam composed of two duplicate disks each having a polygonal side hub with polygonal apertures therethrough, the disks being brought into face contact when assembled, two lever arms having inner hexagonal hubs adapted to fit into the cam disk hubs, a pair of disks with round central apertures to rotatably fit upon the cam hubs and having radial spring fingers adapted to bear upon the inner ends of the inner set of wedge members, with cylindrical bushings to fit the side apertures of the casing and hexagonal apertures to fit upon the cam hubs, and an axial clamping bolt whereby all the said members are held in operative positions.

7. In a friction device, the combination of a casing formed of two duplicate parts each with a centrally apertured side plate, annular wall and integral lever arm, the edges of the annular walls and inner faces of the arms being brought and secured together when assembled, two series of intermeshed wedge members as described in said casing, a cam member having hexagon hubs extending outside the casing adapted to act directly upon the bases of one series of wedge members, lever arms having hexagonally apertured hubs adapted to fit upon the projecting cam hubs with a clamping bolt passing through both lever arms and the casing, the said lever arms being angled and meeting beyond the plane of the casing and suitably connected to form a single arm for operating the cam in opposition to the lever of the casing.

In testimony whereof, I hereunto affix my signature in the presence of two witnesses.

PHELPS M. FREER.

Witnesses:
HOWARD V. DALTON,
JOHN D. DIGNAULT.